June 9, 1953   J. JANOW   2,641,138
VARIABLE PITCH PULLEY
Filed Nov. 5, 1949

Joseph Janow
INVENTOR.

BY

ATTORNEY

Patented June 9, 1953

2,641,138

UNITED STATES PATENT OFFICE 2,641,138

VARIABLE PITCH PULLEY

Joseph Janow, Dallas, Tex.

Application November 5, 1949, Serial No. 125,776

2 Claims. (Cl. 74—230.17)

This invention relates to pulleys composed of complementary and relatively adjustable flange members jointly defining a belt receiving groove of substantially V-section.

Variable pitch pulleys of the type consisting of relatively movable sections are broadly old but for the most part, adjustment of the sections to change the effective diameter of the pulleys is accomplished either through threaded hubs, spacer sleeves and other extra parts which not only add to the cost of the pulleys but also are time consuming in their application, replacement and alignment.

The principal object of the present invention is to provide, in an adjustable pulley or sheave, a simplified means to accomplish adjustment of the pulley sections in a minimum of time and without special tools, the said means consisting of a plurality of tie bolts capable of free slidable movement longitudinally in openings grouped circumferentially about the bore in the hub of one pulley section and adapted for threaded engagement with holes in the confronting face of the companion pulley section, thus to predetermine relative spacing of the pulley sections. Spaced between the tie bolts and threaded in openings in parallelism therewith are set screws adapted to bear on the confronting face of the companion pulley section and effective thereby to hold the sections positively in adjusted positions.

With the foregoing and other objects in view, the invention has further reference to its features of accomplishment, to become manifest as the description proceeds and as illustrated in the accompanying drawing, wherein.

Figure 1:
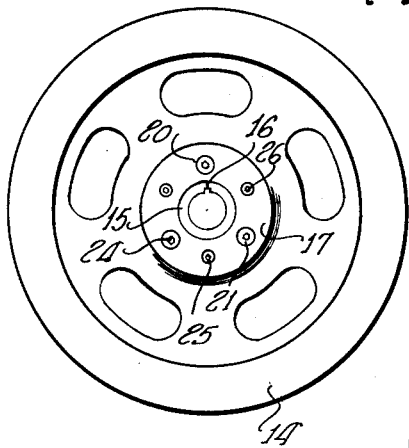
Figure 1 is an end elevational view of a pulley constructed according to the invention.
Figure 2:
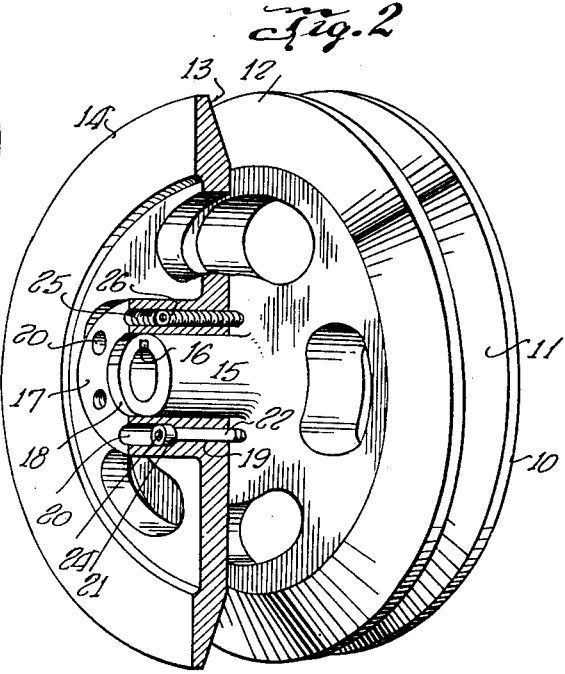
Figure 2 is a perspective view, partly in vertical section.

Continuing with a more detailed description of the drawing, reference numeral 10 denotes a sheave or pulley section which is formed with one or more circumferential belt receiving grooves 11 of V-section and on one face of the pulley section there is provided a tapered portion 12 which forms, jointly with a correspondingly tapered portion 13 of a companion pulley section 14, an adjustable belt groove of generally V-shape.

The pulley section 10 has an integral extended hub portion 15 which is provided with a keyway 16. Mounted for free sliding displacement on the hub portion 15 of the pulley section 10 is the hub 17 of the companion pulley section 14.

Figure 3:
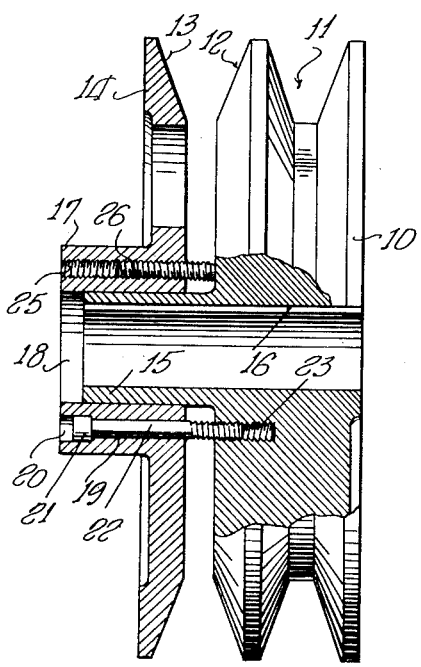
Figure 3 is a side elevational view, partly in longitudinal section.

At spaced intervals about the central bore 18 of the hub 17, the latter is drilled to produce bores 19, parallel with the central bore 18. The bores or openings 19 are counterbored as at 20 to receive the heads 21 of tie bolts 22, which latter extend through the bores 19 and into threaded openings 23 (Fig. 3) in the face of the companion pulley section 10. The bolt heads 21 are each provided with tool engaging recesses 24 for rotating the same.

Interposed between the bores 19 in the hub 17 are axial openings 25 which are threaded throughout their lengths, as shown. A set screw 26 is disposed in each of the openings 25 and is likewise provided with a recess in its end to receive a tool by which it is moved in relation to the confronting face of the pulley section 10 and against which the set screws 26 collectively bear to hold the pulley sections in adjusted position once the adjustment has been predetermined by the bolts 22.

There are of course, many adaptations of the type of pulley herein disclosed, among the most important of which is the tandem drive, which in some cases require several parallel belts. Where there is a need for adjusting the tension on the driving belt, as a result of stretching or wear, it is a simple matter to advance each of the bolts 22 to reduce the space between the two pulley sections 10 and 14 to correspondingly change the spacing of the tapered portions 12 and 13, which actually increases the effective diameter of the pulley and tightens the belt operating thereon. Once the proper tension on the belt obtains, the set screws 26 are advanced against the face of the pulley section 10 thereby securing the section 14 against further inward movement, the shoulders $a$, in the bores 19, preventing outward displacement of the section 14, by reason of the engagement therewith of the heads 21 of the bolts 22.

Conversely, when tension on a belt is to be reduced, the locking or set screws 26 are retracted, after which the bolts 22 are actuated in like manner and the pulley section 14 is moved manually outward. When the desired adjustment is made, the screws 26 are advanced against the face of the pulley section 10 to hold the sections securely together.

Manifestly, the construction as shown and described is capable of some modification and such modification as may be construed to fall within the scope and meaning of the appended claims is also considered to be within the spirit and intent of the invention.

What is claimed is:

1. In a variable pitch multigrooved pulley, a peripherally grooved section having a plano face provided with a tapered perimeter, a hollow hub portion formed integrally with and extending outwardly from the center of said plano surface, said surface provided with a plurality of threaded openings, a companion pulley section having a plano surface confronting that of said peripherally grooved section and provided with a tapered perimeter complementing the tapered perimeter of said latter section to define therewith a belt groove, a hollow hub formed integrally with the center of the face of said companion pulley section opposite its plano face and having an uninterrupted bore of uniform diameter throughout, said hub freely embracing the hub portion of said grooved section, the hub of said companion section having circumferentially spaced threaded and unthreaded axial bores therein, a bolt disposed for free sliding movement in each of said unthreaded bores and adapted to engage the threaded openings in the confronting face of said grooved section to predetermine the relative spacing of said pulley sections, a plurality of set screws disposed in said threaded bores of said hub and adapted to bear against the confronting plano face of said grooved section to hold said sections in relative adjusted positions.

2. In a variable pitch pulley, a first pulley section having a plano face provided with a tapered perimeter, a hollow hub portion formed integrally with and extending outwardly from the center of said plano surface, said surface being provided with a plurality of threaded openings, a companion pulley section having a plano surface confronting that of said first pulley section and provided with a tapered perimeter complementing the tapered perimeter of said latter section to define therewith a belt groove, a hollow hub formed integrally with the center of the face of said companion pulley section opposite its plano face and having an uninterrupted bore of uniform diameter throughout, said hub freely embracing the hub portion of said first pulley section, said companion section having circumferentially spaced threaded and unthreaded axial bores therein, a bolt disposed for free sliding movement in each of said unthreaded bores and adapted to engage the threaded openings in the confronting face of said first pulley section to predetermine the relative spacing of said pulley sections, a plurality of set screws disposed in said threaded bores of said companion section and adapted to bear against the confronting plano face of said first pulley section to hold said sections in relative adjusted positions.

JOSEPH JANOW.

References Cited in the file of this patent

UNITED STATES PATENTS

| Number | Name | Date |
|---|---|---|
| 661,970 | Garland | Nov. 20, 1900 |
| 2,101,084 | Meyers | Dec. 7, 1937 |
| 2,140,182 | Bowen | Dec. 13, 1938 |
| 2,209,737 | Livingston | July 30, 1940 |

FOREIGN PATENTS

| Number | Country | Date |
|---|---|---|
| 464,331 | Great Britain | Apr. 12, 1937 |